Figure 8:

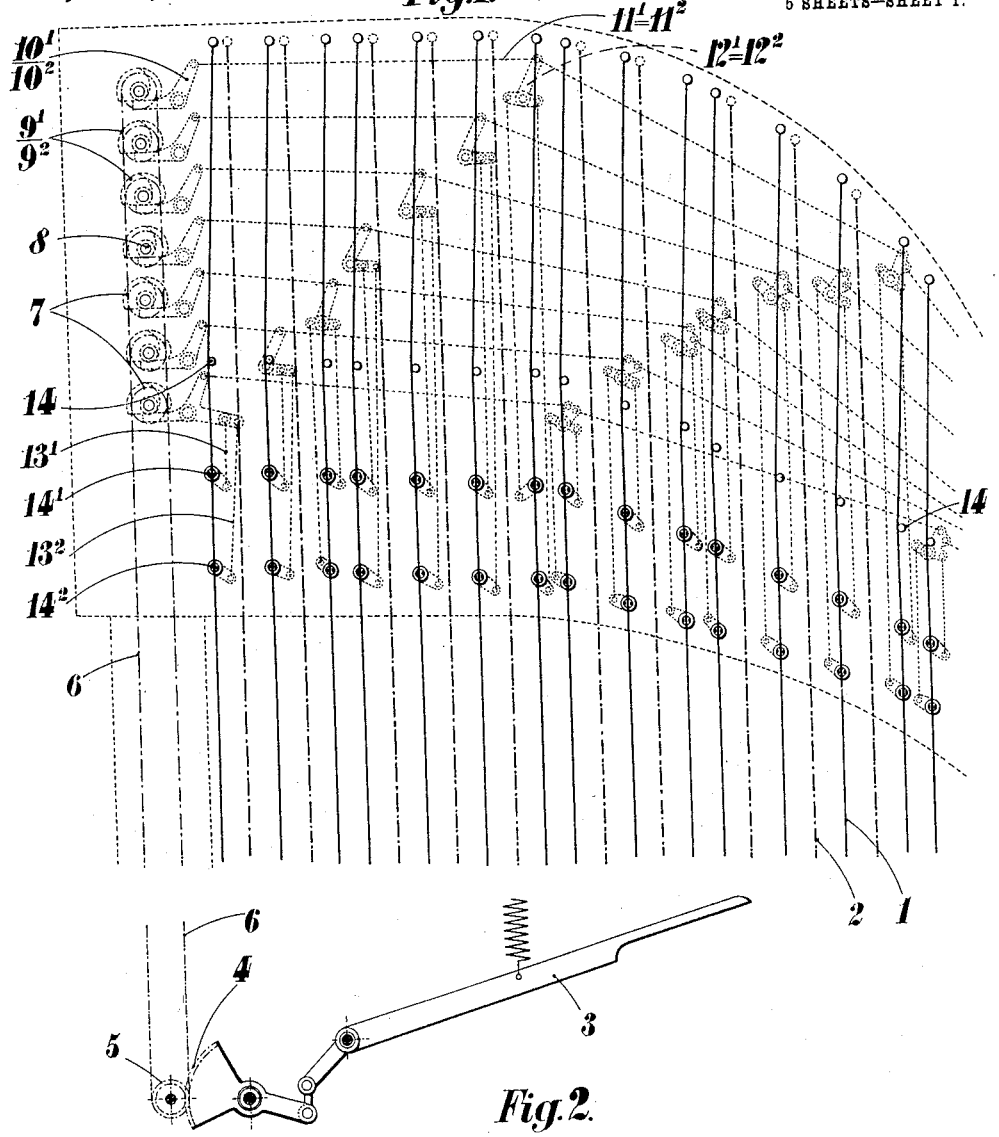
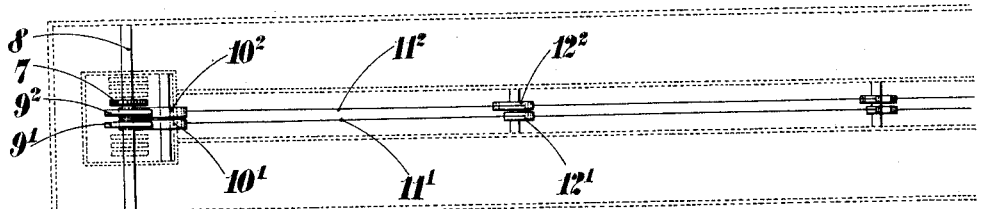

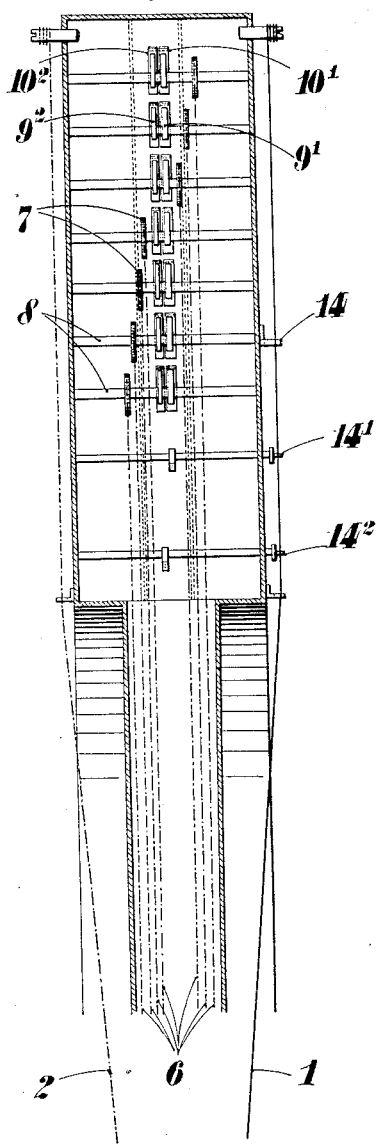

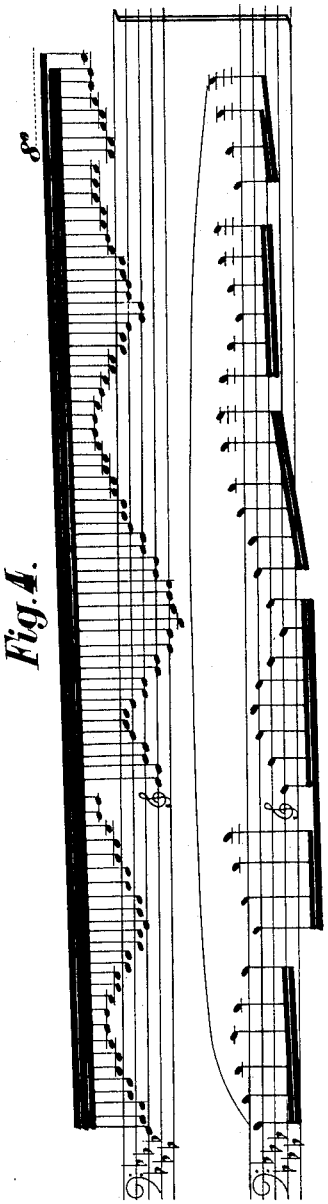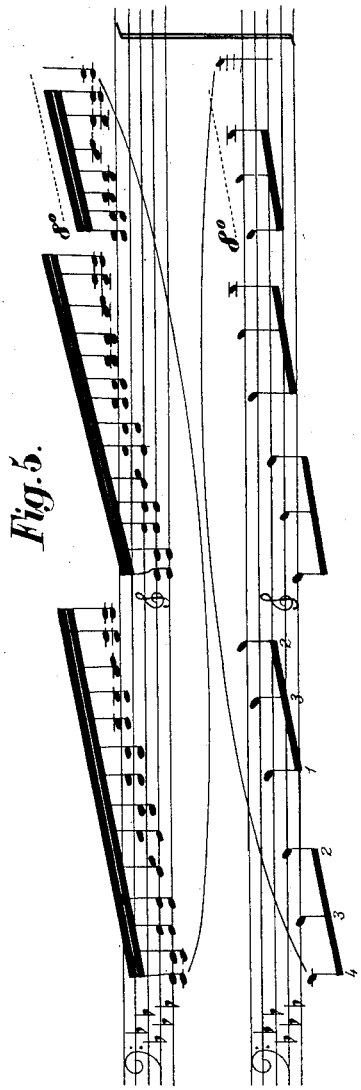

G. F. LYON.
HARP.
APPLICATION FILED DEC. 28, 1909.

1,039,303.

Patented Sept. 24, 1912.
5 SHEETS—SHEET 4.

UNITED STATES PATENT OFFICE.

GUSTAVE FRANTZ LYON, OF PARIS, FRANCE.

HARP.

1,039,303.  Specification of Letters Patent.  Patented Sept. 24, 1912.

Application filed December 28, 1909. Serial No. 535,300.

*To all whom it may concern:*

Be it known that I, GUSTAVE FRANTZ LYON, citizen of the French Republic, residing at Paris, Department of the Seine, in France, have invented certain new and useful Improvements in Harps; and I do hereby declare the following to be a full, clear, and exact description of the invention, such as will enable others skilled in the art to which it appertains to make and use the same.

This invention has for its object to provide an improved harp on which artists accustomed either to the diatonic or to the chromatic harp may play with ease. It further enables, by reason of its construction, effects to be produced, which are impossible with harps as heretofore made, thus offering to composers a much wider field in the use of the harp for the execution of their compositions.

According to this invention the improved harp is provided with two sets of strings preferably arranged in intersecting planes, one of which sets consists of black strings and comprises, like the chromatic harp without pedals, the same notes as the black keys of the piano; these notes do not need to be altered. The harp which forms the subject of this invention is clearly distinguished, however, from the "chromatic harp without pedals" on account of its new character and the special arrangement of the set of white strings. Each string is no longer of a definite length without alteration being possible. On the contrary, a system of pedals enables a number of different lengths to be given at will to the vibrating part of each of these strings, and consequently making them emit different notes. For each of the strings the aforesaid notes are spaced a semi-tone apart. Seven pedals are therefore necessary each of which acts simultaneously by suitable mechanism on the note of the same name in all the octaves.

According to one embodiment of the invention the white or diatonic strings give, as in the diatonic harp, the scale of C flat when all the pedals are raised. When the pedals are depressed to the first notch the white strings give the scale of C major. The lowest position of the pedals gives the same notes a half tone higher, that is to say the pitch of C sharp.

A player desiring to produce effects peculiar to the diatonic harp will be able to do so in the ordinary manner with this harp by playing only on the white strings without making use of the black strings, with the ordinary combinations of pedals. A harpist desiring to play on the ordinary chromatic harp will place all the pedals in the first notch when he will have at his disposal the two sets of strings of a chromatic harp; he will leave the pedals unmoved, the white strings then giving the scale of C major. The use at the same time of the black strings and of the white strings (these latter with the operation of the pedals), will enable special effects to be obtained of which some examples will be given later on.

Referring to the drawings: Figures 1, 2 and 3 represent by way of example one manner of constructing the improved harp. Fig. 1 is a front elevation of a part thereof. Figs. 2 and 3 are respectively a plan and a side elevation of the part shown in Fig. 1. Figs. 4 to 9 inclusive show examples of musical exercises or compositions in which are embodied some of the special effects previously mentioned.

The white strings 1 are designated by full lines, the black strings 2 by lines composed of alternate long and short dashes. They are located in two oblique intersecting planes and the black strings need not be altered in any way. The white strings 1, on the contrary, can emit three distinct notes by the intervention of suitable mechanism, that shown presenting of itself no particular novelty.

The regulation is effected by means of seven pedals 3 each actuating, by a system of levers, a toothed sector 4 which controls a pinion 5 which engages with a chain 6. The seven chains 6 extend to the upper part of the harp on to an equal number of toothed wheels 7 mounted on shafts 8. On each of these shafts 8 a series of two cams $9^1$, $9^2$ is also mounted which respectively control bell crank levers $10^1$, $10^2$ to which are attached chains or other transmission devices $11^1$, $11^2$.

The chains $11^1$, $11^2$ actuate corresponding sets of two-armed levers $12^1$, $12^2$ distributed over the whole extent of the white strings. In each octave one of the arms of the levers $12^1$ is united by a suitable connection $13^1$ to a clip $14^1$. Each lever $12^2$ is connected also by a connection $13^2$ to a clip $14^2$. Each white string passes over a nut 14 before engaging with the clips $14^1$ and $14^2$.

The cams 9¹ and 9² are shaped in such a manner as to actuate in turn their levers 10¹ and 10² in accordance with the extent to which the pedal 3 is depressed.

The operation of the pedals is as follows: When the pedal 3 is in its uppermost position all the white strings of the same note, all the C's for example, are strained by the fixed nuts 14. As has been explained in the preamble all the C strings will then be tuned to C flat. When the pedal 3 is depressed one notch, the cam 9¹ acts on the lever 10¹ and by means of the parts 11¹, 12¹ and 13¹, the clips 14¹ will be brought into contact with the strings, and if we take the C's for example the depression to the first notch of the C pedal will give throughout the whole set of white strings C natural. A further depression of the pedal, by means of an identical operation, will bring the clips 14² into action and in all the octaves the notes corresponding to the pedal will be made sharp. It is therefore possible with seven pedals, to make any desired note flat, natural or sharp in all the octaves simultaneously. With regard to the black strings, they will remain unaltered and will give, as on the piano, the following notes: C sharp, D sharp, F sharp, G sharp and A sharp.

If an instrument constructed in this manner is placed in the hands of a player accustomed to the ordinary diatonic harp, he will very easily be able to play on it by using only the white strings. The pedals will operate exactly as in the case of a diatonic harp. A player accustomed to the chromatic harp can similarly use the same instrument without the slightest difficulty. He will depress all the pedals to the first notch, and will leave them there; he will then have a chromatic harp at his disposal. But beyond this very interesting possibility of being able to use the harp at will either as a chromatic or a diatonic harp without inconveniencing the executant accustomed to the one or the other, the improved harp may be employed by a player who will use at the same time the black and the white strings and the pedals. This will permit of a large number of effects and combinations being produced, which are impossible either with the diatonic or the chromatic harp alone. Referring to Figs. 4 to 9 some examples of these effects are as follows:—

Fig. 4: This phrase will be executed by sliding the right hand (glissando) while the left hand will play only on the black strings. The seven pedals of the white strings will be arranged in such a manner as to give D sharp, C sharp, B flat, A sharp, G flat, F sharp and E flat.

Fig. 5 gives another example of an effect obtained by sliding the right hand while the left hand plays the black strings. The combination of pedals necessary is as follows: D sharp, C natural, E flat, A sharp, G flat, F sharp, E flat.

Figure 6:
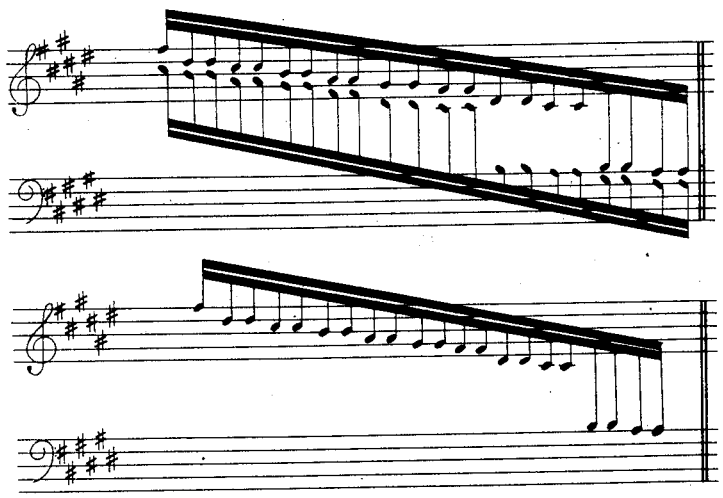

Fig. 6 shows two phrases to be executed with the following combination of pedals: B natural, C flat, D flat, E flat, F sharp, G sharp, A sharp. The first of these phrases is played like a descending chromatic scale in major thirds, the right hand starting from the white string of F and the left hand from the black string of G sharp. As regards the second phrase it comprises six notes doubled at intervals of seconds. This combination is evidently only possible with the improved harp, because between two doubled notes given by four neighboring strings on the diatonic harp, there is always an interval of a third.

Figure 7:
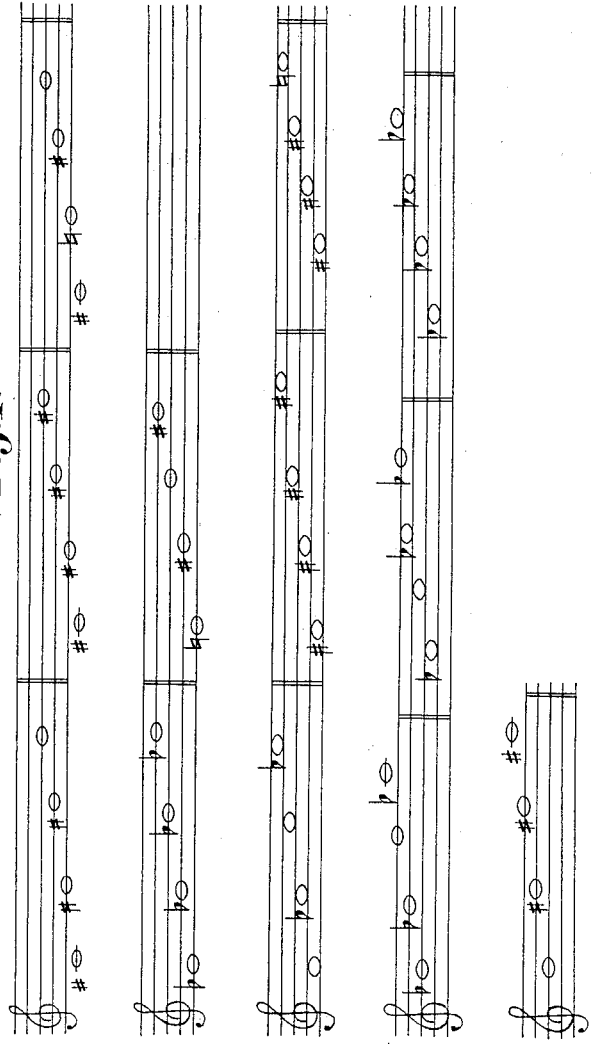

Fig. 7 shows a series of chords, all the notes of which can be doubled simultaneously on the improved harp. It may be remarked that with the diatonic harp more than three notes cannot be doubled simultaneously, as there are only seven strings to an octave. The improved harp, on the contrary, can double at the same time four notes and Fig. 7 shows some of these possible chords, to which may be added all the combinations which do not contain D natural, G natural, or A natural.

Figure 9:

Figs. 8 and 9 give an example of the possibilities of the improved harp for a composer in the orchestration of his compositions.

Fig. 8 shows, as written by the author, the first notes of the Minuet of l'Arlesienne. The composer has recommended the harpist not to double the notes at the octave, as he considered that that would not produce a satisfactory effect. Besides with the use of the pedals it would only be possible to double the G sharp by A flat, but the E cannot be doubled by F flat because this F must be made sharp; similarly, this F sharp cannot be doubled by the G flat because the G is also made sharp. This recommendation becomes unnecessary with the improved harp, which allows all the notes to be doubled in unison and in this manner a notable strengthening of the effect of bells can be obtained. The pedals of the white strings will give A flat, G flat and F flat. In this way, G sharp will be obtained on the black strings, doubled by A flat on the white strings; F sharp on the black strings, doubled by G flat on the white strings. As regards E natural, white strings (first notch of the pedals), it will be doubled by means of the white string of F flat. This last example is printed in the classical repertoire, and shows that in certain cases a single harp of the improved type can produce the effect of two ordinary harps.

I have described my invention as applied to a harp the pedals of which have two movements. It is evident, however, that without departing from the spirit and scope of the invention, it would be possible to complete the mechanism by a third movement of the pedals for the white strings in the manner described in the specification of British Patent No. 24,857 of 1905 dated the 21st December 1904.

Numerous other changes may also be made without digressing from my inventive idea, the scope of which is defined in the following claims.

I claim:

1. A harp having diatonic strings, means operable by the player while playing to alter the key in which said strings are tuned, and another set of strings to coöperate with the first set in producing a chromatic scale.

2. A harp having a set of strings, means to alter simultaneously the tuning of the strings in all the octaves having the same name, and a second set to coöperate with the first in producing a chromatic scale.

3. A harp having two sets of strings, and tuning means operable by the player while playing by which a chromatic scale may be produced by said sets in conjunction or certain notes may be doubled.

4. A harp having crossed sets of strings, and means operable by the player while playing to cause certain notes to be doubled in all the octaves simultaneously.

5. A harp having a set of diatonic strings, means operable by the player while playing to tune each of said strings to emit any of three tones, and a second set of strings to coact with the first set, when the strings of the latter are tuned to give the intermediate of the aforesaid three tones, in producing a chromatic scale.

6. A harp having a diatonic set of strings, pedals to alter the tuning of all of said strings thereby changing the key from C flat to C natural or C sharp, and a set of strings to produce in connection with the first set, when the latter are tuned in C natural, a chromatic scale.

7. A harp having a diatonic set of strings, pedal mechanism for altering simultaneously the tuning of the strings having the same name in all the octaves, and a set of strings coöperating with the diatonic strings to produce a chromatic scale.

8. A harp having a diatonic set of strings disposed in one plane, a set of strings to complete a chromatic scale arranged in a plane intersecting that of the first set, and pedal mechanism to alter the tuning of the strings of the first set.

9. A harp having a diatonic set of strings normally tuned in C flat, pedal mechanism to change the tuning to C natural, and a set of auxiliary strings to produce in connection with the first set, when the tuning is so changed, a chromatic scale.

10. A harp having a diatonic set of strings normally tuned in C flat, pedal mechanism associated with said strings only and operable by the player to change the tuning thereof to C natural and also to C sharp, and a set of permanently adjusted strings to produce in connection with said first set, when the latter are adjusted to the key of C natural, a chromatic scale.

In testimony whereof I affix my signature, in presence of two witnesses.

GUSTAVE FRANTZ LYON.

Witnesses:
H. C. COXE,
EMILE KLOTZ.

---

Copies of this patent may be obtained for five cents each, by addressing the "Commissioner of Patents, Washington, D. C."